Feb. 25, 1941. J. C. CROWLEY ET AL 2,232,772
CUTTING TORCH OR BLOWPIPE
Filed Jan. 21, 1937 2 Sheets-Sheet 1
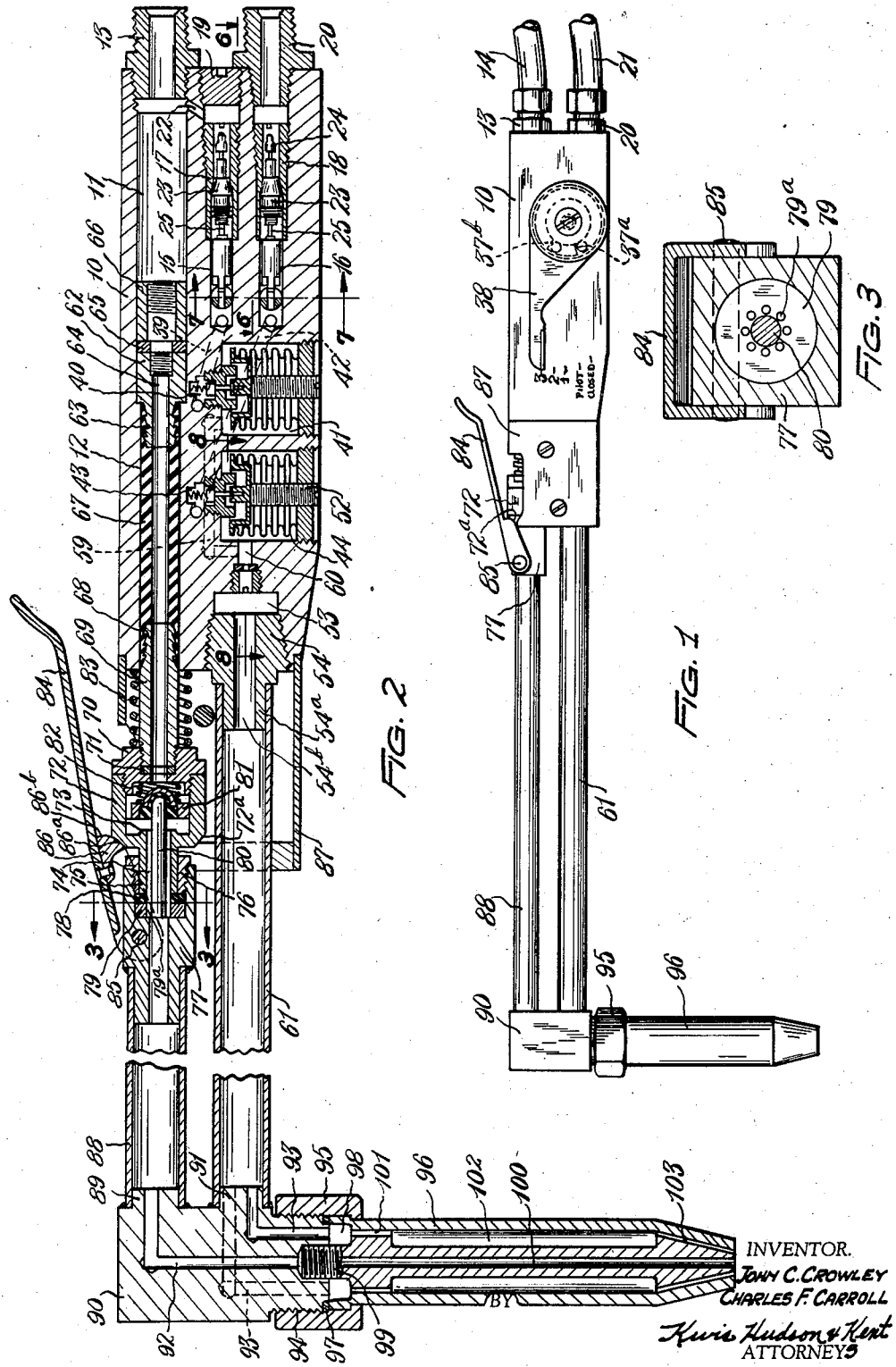
INVENTOR.
JOHN C. CROWLEY
CHARLES F. CARROLL
BY
Kurie Hudson & Kent
ATTORNEYS Feb. 25, 1941. J. C. CROWLEY ET AL 2,232,772
CUTTING TORCH OR BLOWPIPE
Filed Jan. 21, 1937 2 Sheets-Sheet 2

INVENTOR.
JOHN C. CROWLEY
BY CHARLES F. CARROLL
Kwis Hudson & Kent
ATTORNEYS

Patented Feb. 25, 1941

2,232,772

UNITED STATES PATENT OFFICE 2,232,772

CUTTING TORCH OR BLOWPIPE

John C. Crowley and Charles F. Carroll, Cleveland Heights, Ohio; said Crowley assignor to The Dill Manufacturing Company, Cleveland, Ohio, a corporation of Ohio Application January 21, 1937, Serial No. 121,662

5 Claims. (Cl. 158—27.4)

This invention relates to a cutting torch or blowpipe adapted to be used either for cutting metal or in the welding of metal.

A cutting torch or blowpipe of the type to which the present invention relates is connected to a source of suitable inflammable gas under pressure and also to a source of oxygen under pressure, the gas and oxygen becoming suitably mixed in the torch to give the required and correct combustible mixture. When a torch of this kind is used for the cutting of metal, the metal is first preheated by means of the flame produced at the nozzle of the torch by the ignited combustible mixture of gas and oxygen, and after the metal has been sufficiently heated a jet of the oxygen alone is directed against the metal and acts to destroy the carbon in the metal and to effect a severing thereof. When the torch is used in the welding of metal it is only necessary to employ the flame of the ignited combustible mixture of oxygen and gas. The manner in which a cutting torch or blowpipe of this character is employed for either cutting metal or welding metal is well understood in the art and need not be explained in greater detail, except to refer to the fact that heretofore torches of this character have been provided with separate manually manipulated valves controlling the flow of gas and oxygen to the nozzle. It has been necessary for the operators of torches of this kind to be extremely skilled, inasmuch as they must determine by a visual inspection of the flame if the proper combustible mixture is being employed and they must constantly adjust the manually manipulated control valves to compensate for decreases or changes in the pressure of the supply sources for the gas and oxygen.

An object of the present invention is to provide an improved cutting torch or blowpipe which is so constructed that the proper combustible mixture of gas and oxygen will always be obtained at the nozzle without the necessity of constant manipulation of control valves and the like.

Another object is to provide a cutting torch or blowpipe which may be correctly operated by a relatively unskilled operator.

A further object is to provide a cutting torch or blowpipe wherein the proper combustible mixture of gas and oxygen is obtained at the nozzle by merely moving a single control lever to a predetermined position, in which position said lever remains during the operation of the torch.

A still further object is to provide a cutting torch or blowpipe wherein a constant predetermined flow pressure of gas and oxygen is delivered to the nozzle irrespective of changes or decreases in the pressures in the supply lines due to the consumption of gas and oxygen.

An additional object is to provide a cutting torch or blowpipe wherein a perfect combustible mixture is present at the nozzle at all times and which does not require manipulation of control valves during use to compensate for any drop of pressure in the supply lines.

A still further object is to provide a cutting torch or blowpipe wherein the passage of the unmixed oxygen to the nozzle for cutting the metal is controlled by a valve which remains in either the closed or open positions until changed by the operator.

Another object is to provide a cutting torch or blowpipe which is relatively simple in construction, efficient in operation and can be easily controlled and manipulated.

Further and additional objects and advantages not hereinbefore specified will become apparent hereinafter during the detailed description which is to follow of an embodiment of the invention that is illustrated in the accompanying drawings wherein—

Fig. 1 is a side elevational view of the cutting torch or blowpipe on a reduced scale.

Fig. 2 is a longitudinal sectional view through the cutting torch or blowpipe on a larger scale than Fig. 1, the dual valves controlling the flow of gas and oxygen into the torch to provide the combustible mixture, and the valve controlling the flow of oxygen alone to provide the cutting jet being shown in open position.

Fig. 3 is a detail sectional view on a larger scale than Fig. 2 and is taken substantially on line 3—3 of Fig. 2.

Figure 6:
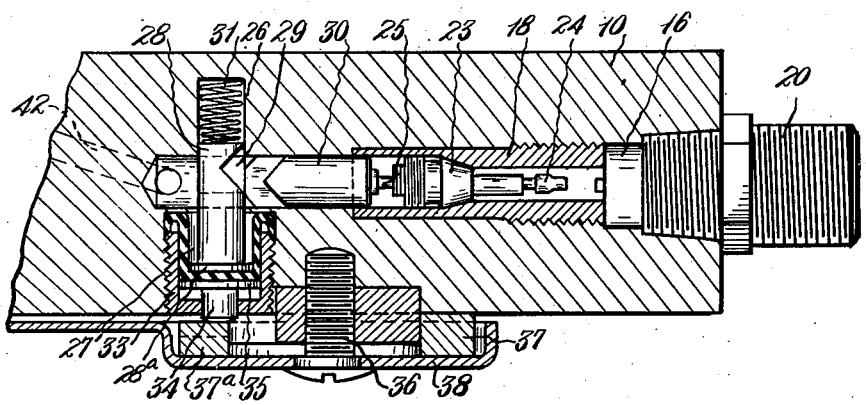
Figure 7:
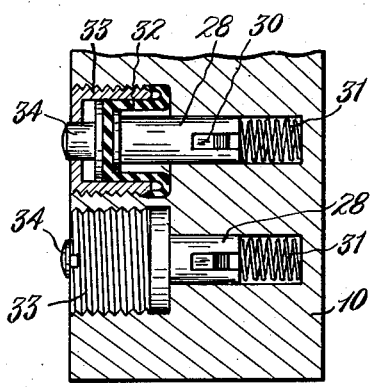
Figure 8:
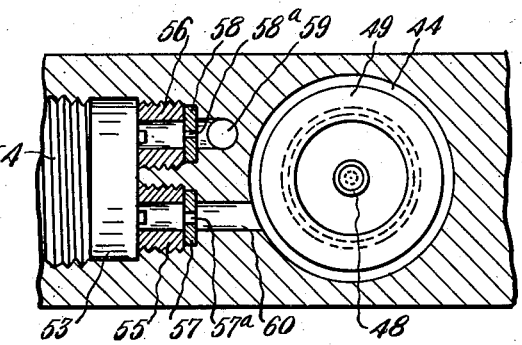

Fig. 6 is a fragmentary sectional view on a larger scale than Fig. 2 and is taken substantially along the line 6—6 of Fig. 2 looking in the direction of the arrows, and Figs. 7 and 8 are fragmentary sectional views on a larger scale than Fig. 2 and are taken respectively along lines 7—7 and 8—8 of Fig. 2 looking in the direction of the arrows.

The cutting torch or blowpipe comprises a body portion 10 constructed of suitable metal and provided adjacent its upper side with a longitudinally extending passage formed of a portion 11 of relatively large diameter and a portion 12 of relatively small diameter. The outer end of the portion 11 of the passage is threaded to receive a threaded fitting 13 to which a conduit 14 is connected and which extends to a suitable tank of oxygen under pressure. The body 10 beneath the portion 11 of the passage is provided with a pair of vertically spaced parallel longitudinally extending circular recesses 15 and 16, the right hand ends of which, as viewed in the drawings, being of enlarged diameter and shaped to receive bushings 17 and 18, respectively, which are screwed into the recesses. The recess 15 is closed by a suitable plug 19 screwed into the tapped end of the recess, while the tapped end of the recess 16 receives a threaded fitting 20 to which is connected a conduit 21 that extends to a source of supply of a suitable inflammable gas under pressure as will be well understood. The recess 15 is in communication with the enlarged portion 11 of the passage by means of a port 22, as clearly shown in Fig. 2. The bushings 17 and 18 are each provided with internal bores so shaped as to receive a valve core or valve insides 23 of the type employed in the valve stems of pneumatic tires and well understood in the art. As is common with valve cores or valve insides of the type referred to, the valve proper indicated at 24 and which seats against the end of the barrel of the insides or core is carried by a movable pin 25 extending through the core or insides and mounting a spring which normally maintains the valve proper in seated position.

Bores 26 are formed in the body and extend transversely of the recesses 15 and 16 adjacent the inner ends of said recesses and communicate with counterbores 27 arranged coaxially with the bores 26 and extending to the outer side of the body. Slidable pins 28 are mounted in the bores 26 and are provided intermediate their ends with V-shaped camming notches 29 that cooperate with the chamfered ends of sliding pins 30 mounted with a clearance in the reduced portions of the recesses 15 and 16 and engaging at their opposite ends the ends of the valve pins 25. The pins 28 operate against the tension of springs 31 and are normally so located that the chamfered ends of the pins 30 engage in the V-shaped notches 29, at which time the valves proper 24 of the valve insides are seated. However, when the pins 28 are moved inwardly against the tension of the springs 31 in a manner later to be described the pins 30 will be cammed to the right, as viewed in Fig. 6, by the camming notches 29, with the result that the valve pins 25 are depressed and the valves 24 unseated. The pins 28 are provided at their outer ends with heads 28a which abut the interior bottom of cup-shaped rubber members 32 that are clamped in the counterbores 27 by means of threaded cup-shaped metal bushings 33 which are screwed into the counterbores. The rubber members 32, due to their elasticity allow movement of the pins 28. The bottoms of the cup-shaped bushings 33 are provided with centrally disposed openings through which pins 34 project to the outer side of the body, said pins being provided with annular heads 35 that engage the outer side of the bottoms of the members 32, as clearly shown in Fig. 6. Rotatably mounted upon the side of the body 10 by means of a stud 36 is a cam member 37 provided with two spaced camming portions 37a and 37b. An operating lever 38 is mounted on the stud 36 exteriorly of the camming member and is secured to said member, whereby when said lever is moved said camming member will also be moved so that the camming portion 37a will first depress its cooperating pin 34 that acts against the lowermost of the pins 28 inwardly against the action of its spring 31 to effect an opening movement of the valve insides that is mounted in the lower recess 16, after which continued movement of the lever in the same direction similarly effects an opening of the valve insides in the recess 15. The purpose of first opening the valve insides in the recess 16 before the insides in the recess 15 is opened is to cause a flow of gas through the torch to the nozzle which may be ignited and act as a pilot light, after which the oxygen can pass through the torch and be mixed with the gas into the proper combustible mixture.

As indicated in Fig. 1, when the lever 38 is in its most downward position, as indicated by the word "closed" the valves proper of both of the valve insides are seated. When the operator moves the lever from the closed position to that indicated by the notation "pilot" the valve insides is opened in the recess 16 to permit a small flow of gas to pass through the torch, as previously explained, to provide a pilot light. Then when the lever has been moved to position No. 1 both gas and oxygen will be flowing through the torch and the further movements of the lever to positions 2 and 3 act to open the valve insides further to permit a greater flow of both gas and oxygen through the torch, it being understood that the different operative positions to which the lever may be moved, i. e., positions 1, 2 and 3, will be determined by the size of the nozzle that is being employed upon the torch, as well as by the pressures of oxygen and gas desired for particular classes of work. It will be understood that the volume of the incoming gas and oxygen can thus be regulated or controlled at the inlet end of the torch and such regulation or control may be used in conjunction with and supplementary to the regulation or control effected by metering orifices later to be referred to and located adjacent to the mixing chamber, or the said regulation and control can be employed without the regulation or control afforded by the metering orifices if it is so desired.

Suitable means, such as spring points or other means, will be provided for maintaining the lever 38 in the different positions to which the operator has moved it, wherefore after said lever has been set it is unnecessary for the operator to alter or change its position until the work has been completed.

Figure 4:
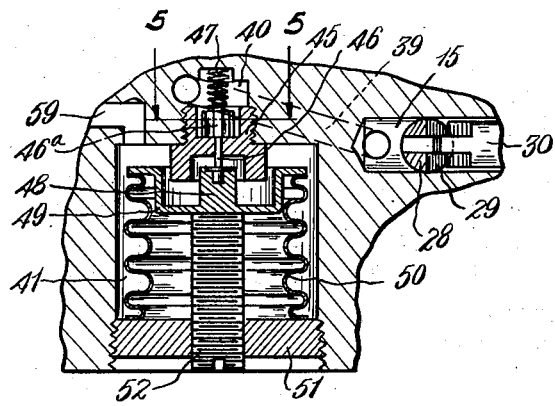
Fig. 4 is a fragmentary sectional view on a larger scale than Fig. 2 and illustrates one of the bellows controlled valves that regulate the flow pressure of the gas and oxygen through the cutting torch or blowpipe.
Figure 5:
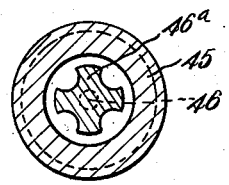
Fig. 5 is a detail sectional view taken substantially on line 5—5 of Fig. 4 looking in the direction of the arrows.

The inner end of the recess 15 is in communication by means of a passage 39 with the inner end of a bore 40, see Fig. 4, which bore, in turn, communicates with a counterbore 41 formed in the body. The inner end of the recess 16 is in communication by means of a passage 42 with a bore 43 formed in the body and communicating with a counterbore 44 (see Fig. 2), said bore 43 and counterbore 44 being identical with the bore 40 and counterbore 41 previously referred to and lying adjacent each other but spaced longitudinally of the body. Counterbores 41 and 44 and the bores 40 and 43 are clearly shown in Figs. 2 and 4, it being noted that the bores 41 and 43 are tapped adjacent their outer ends to receive threaded members 45 which are provided with oppositely facing cup-shaped portions, one of which extends into the counterbores and the other of which extends into the bores, with the cup-shaped portions that extend into the counterbores of larger diameter than the other cup-shaped portions, wherefore a shoulder is provided which bears against the bottom of the counterbores. Intermediate the ends of the members 45 is a transversely extending partition forming the common bottom of both cup-shaped portions and provided centrally with an opening through which extends with a loose fit the pin 46 of a valve 46a that is located in the cup-shaped portions within the bores and seats upon the partition, it being noted that said head 46a, as shown in Figs. 4 and 5, is so shaped that even when seated there will be a seepage of oxygen or gas through the opening in the partition. Springs 47 located in the bores 40 and 43 act to normally hold the valve 46a in seated position. The valve pins 46 have their outer ends cooperating with centrally disposed bosses 48 formed on flanged cup-shaped members 49 located in the counterbores 41 and 44 and secured to one end of expansible bellows 50 and forming the closure for said end of the bellows. The opposite ends of the bellows are secured to and closed by means of threaded discs 51 which are screwed into the threaded outer ends of the counterbores and act to hold the bellows in position. Centrally disposed threaded studs 52 extend through openings in the discs 51 and engage the bottom of the cup-shaped members 49, wherefore the amount of compressing movement of the bellows can be adjusted by adjusting the studs 52. The bellows will be preselected as to strength and size, such as to be compressed by a predetermined pressure, wherefore when the cup-shaped members 49 engage the inner ends of the studs 52 the valves 46a will be seated, although, as previously explained, a seepage of oxygen and gas into the bellows chambers or counterbores 41 and 44 will still be taking place. The left hand end of the body 10 is provided with a tapered recess 53 threaded to receive an externally threaded tapered plug 54 that extends, when in fully seated position, part way into the recess 53, said plug being provided on its left hand end, as viewed in the drawings, with a reduced extension 54a and having a centrally disposed bore 54b extending completely through the extension and plug. The recess 53 communicates at its right hand end with a pair of reduced threaded parallel bores spaced transversely of the body and into which are screwed bushings 55 and 56 (see Fig. 8), the inner ends of which engage and hold in clamped position gaskets 57 and 58 which are provided with different size openings or metering orifices 57a and 58a, respectively. The metering orifice in the gasket 57 is in communication with the counterbore or bellows chamber 41 by means of a passage 59, while the metering orifice in the gasket 58 is in communication with the counterbore or bellows chamber 44 by means of a passage 60 formed in the body.

A tube or pipe 61 has one end secured to the reduced extension 54a of the plug 54, while its opposite end is secured to a nozzle receiving tip later to be described.

In the portion 11 of the passage that extends longitudinally through the body 10 there is arranged a fitting 62 provided with a reduced extension 63 that has formed thereon annular ribs or projections for a purpose later to be explained.

The fitting 62 abuts the shoulder formed at the left hand end, as viewed in the drawings, of the portion 11 of the passage that is of large diameter, while the extension 63 extends into the portion 12 of said passage which is of smaller diameter. The fitting 62 is provided with a longitudinally extending bore 64 that extends through the extension 63 and the fitting and communicates with a centrally disposed opening arranged in a gasket 65 and located in the portion 11 of the passage. The gasket 65 is clamped between the fitting 62 and a cylindrical bushing 66 also located in the portion 11 of the passage, it being noted that the fitting 62, gasket 65 and bushing 66 have a close driving fit in the bore of the enlarged portion 11 of the passage. An expansible tube 67, preferably formed of rubber, is located in the reduced portion 12 of the passage and has one of its ends secured to the reduced extension 63 of the fitting 62, preferably by vulcanizing the same thereto, while its other end is secured, preferably by vulcanization, to the reduced extension 68 located in the reduced portion 12 of the passage and formed on one end of a metal connecting tube 69, the opposite end of which tube is threaded and screwed into a threaded counterbore formed in a connecting nut 70, said end of the tube clamping a suitable gasket 71 between it and the bottom of the counterbore in the connecting nut 70. The connecting nut 70 is threadedly connected to a cup-shaped member 72, as clearly shown in Fig. 2, which member is provided at its bottom with a valve seat 73 surrounding a cylindrical bore 74 extending through the bottom of the member 72 and through a cylindrical extension 75 formed thereon and projecting toward the left, as viewed in Fig. 2, and having a sliding fit in a nut 76 that is screwed into a counterbore formed in a connecting plug member 77, said nut 76 clamping a gasket 78 between its left hand end and the head 79 of a valve pin 80 that is fixedly mounted in the counterbore of the plug member 77, it being noted that when the parts are in the position shown in Fig. 2 the left hand end of the extension 75 of the member 72 engages said gasket in sealing relationship. The valve pin 80 is of less diameter than the bore 74 through the extension 75, while the head 79 of said valve pin is provided with a plurality of openings 79a, as clearly indicated in Figs. 2 and 3. The valve pin 80 is of such length as to extend through the bore 74 into the cup portion of the member 72 and abuts at its right hand end, as viewed in Fig. 2, a valve 81 formed of a rubber or flexible seating portion and a metal backing, said metal backing having a centrally disposed dome-like projection which acts to center a spring 82 located between the valve and a recess formed on the left side of the nut 70.

As already stated, the head 79 of the valve pin is fixedly mounted in the plug member 77, and since said member 77 is stationary and the extension 75 of the cup member 72 is slidably mounted in the nut 76, it will be evident that relative movement can take place between the member 72, the plug 77 and the valve pin 80, since the member 72 is connected through the metallic tubular member 69 to the expansible and contractible rubber tube 67.

A coil spring 83 is arranged on the metal connecting tube 69 intermediate the left hand end of the body 10 and the connecting nut 70 and acts to normally urge the nut 70 and member 72 toward the left to seat the end of the extension 75 on the gasket 78. A lever 84 is provided with a U-shaped portion that straddles the plug 77 and is pivotally connected thereto by means of a pin 85, see Figs. 2 and 3. Intermediate the downwardly extending arms of the U-shaped portion of the lever 84 and on the underside of the lever there is secured a camming block 86 provided with an inclined surface 86a and a straight surface 86b, which surfaces cooperate with a chamfered or inclined surface 72a formed on the left hand end of the member 72. As illustrated in Fig. 2, the valve 81 is in unseated position and the lever 84 is in its raised or upper position. In order to close the valve the operator depresses the lever 84, with the result that the inclined surface 86a on the camming block 86 acts against the chamfered surface 72a on the member 72 to move the latter toward the right, as viewed in the drawings, against the action of the spring 83, such movement compressing the rubber tube 67 in the reduced portion 12 of the passage through the body 10. As previously stated, the valve pin 80 is stationary, and hence the movement of the member 72 toward the right by the depression of the lever 84 brings the gasket of the valve 81 into sealing relationship with the valve seat 73 in the bottom of the member 72 to seal or close the direct passage from the oxygen supply to the nozzle of the cutting torch or blowpipe. The parts are so proportioned that when the valve 81 has moved to seated position the surface 86b of the camming block comes into engagement with the left hand end of the member 72 and since the spring 83 is constantly urging said member toward the left the lever 84 is held in its downward position and the valve 81 is maintained in seated relationship with respect to the valve seat 73. When the operator wishes to open the valve 81 it is merely necessary for him to move the lever 84 to its upper position, as shown in Fig. 2, whereupon, due to the spring 83, the parts will assume the position shown in the drawings.

A shield 87 is located at the left hand end, as viewed in the drawings, of the body 10 and surrounds the cutting torch or blowpipe to substantially enclose the cup-shaped member 72 and its associated parts. A metallic tube or pipe 88 has one of its ends secured to the reduced extension formed on the left hand end of the plug 77, while its opposite end is secured to a boss 89 formed on the tip 90 to which the nozzle is connected. A boss 91 similar to the boss 89 is also formed on the tip 90 below the boss 89 and the left hand end of the tube or pipe 61 previously referred to is connected to said boss.

A passage 92 extends centrally through the tip 90 and then at its upper end transversely thereof and through the boss 89, so that said passage is in communication with the tube or pipe 88. The tip 90 is also provided with a plurality of passages 93, having portions extending parallel to the vertically arranged portion of the passage 92 and other portions extending laterally therefrom and passing through the boss 91 and being in communication with the tube or pipe 61. The lower end of the tip 90 is reduced and exteriorly threaded, as indicated at 94, and can have screwed thereon the usual connecting nut 95 of the conventional nozzle 96 used with cutting torches of this type. When the nozzle 96 is fully connected with the tip, that is when the nut 95 is screwed tightly thereon, the upper end of the nozzle engages a gasket 97 to form a tight seal between the tip and the nozzle, it being noted that the upper end of the nozzle is provided with an annular recess 98 having centrally therein a threaded tubular extension 99 which screws into a threaded counterbore at the lower end of the passage 92 in the tip. A passage 100 extends centrally through the nozzle and is in communication with the passage 92 in the tip. A plurality of short passages or ports 101 connect the recess 98 with a cylindrical hollow portion 102 formed in the nozzle and surrounding the passage 100, while at the lower tapered end a plurality of short passages or ports 103 connect the hollow portion 102 with the end of the nozzle. Inasmuch as the construction of the nozzle is conventional it is not believed necessary to describe the same in greater detail.

In order to fully explain the construction of the cutting torch or nozzle embodying the present invention and to bring out the advantages and improvements existing therein over cutting torches of known construction, the operation of the device when used for both cutting metal or for welding metal will now be described.

Assuming that the cutting torch is to be used for the cutting of metal and that the fittings 19 and 20 are connected to a source of supply of oxygen and gas, respectively, and that the lever 38 is in closed position as is also the lever 84, the operator first moves the lever 38 from the closed position to the pilot position to slightly open the valve insides in the recess 16 to permit a small flow of gas to the nozzle. The camming portions 37a and 37b on the lever 38 are so proportioned and related that the movement of the lever 38 from closed to pilot position will act to slightly open the valve of the valve insides in the recess 16 but will not at that time affect the valve insides in the recess 15. It will also be understood that the valves 46a and the bellows 50 are adjusted for predetermined oxygen and gas pressure and that the metering orifices 57a and 58a are of predetermined size. After the lever 38 has been moved from closed to the pilot position a small flow of gas passes through the passage 42 into the bellows chamber 44, the valve 46a at this time being held open by the bellows. The gas will flow through the passage 60 from the bellows chamber and through the metering orifice 57a and into the pipe or tube 61, from whence it passes through the passages 93 into the passages 91, hollow portion 102 and passages 103 of the nozzle. The operator now ignites the gas leaving the tapered end of the nozzle to form a pilot light, after which he moves the lever 38 from pilot position to positions 1, 2 or 3, as the case may be, to further open the valve of the valve insides in the recess 16 and to open the valve of the valve insides in the recess 15 to permit a flow of oxygen through the passage 39 and into the bellows chamber 41. At this time the valves 46a in both bellows chambers will be in open position and the oxygen and gas can flow from the bellows chambers 41 and 44, respectively, through the passages 59 and 60 to the metering orifices 58a and 57a, which orifices are so proportioned as to size as to allow predetermined amounts of the gas and oxygen to pass into the pipe or tube 61, which amounts are so related that the proper combustible mixture of the gas and oxygen is effected.

It will be understood that when the pressures of the gas and oxygen flowing into the bellows chambers 44 and 41 obtains to the pressures for which the bellows are adjusted that then said bellows will be collapsed and the valves 46a will move to seated position, there still being, as previously explained, a seepage of gas and oxygen into the bellows chambers past the valves 46a wherefore the flow of gas and oxygen to the nozzle is never completely stopped during the operation of the torch. The use of the gas and oxygen at the nozzle will cause a lowering of the pressures in the bellows chambers, whereupon the bellows will expand and open the valves 46a. This cycle of operation will be repeated in rapid succession, so that, in effect, the valves 46a and the bellows 50 move from closed to open positions by a rapid series of pulsations. The operation of the bellows controlled valves is such that the gas and oxygen flowing to the metering orifices will always be at the desired pressures and such pressures will not be affected by the consumption of the oxygen and gas as the tool is used, with a consequent decrease in pressure in the tanks containing the same, until, of course, the pressures in the tanks have reached a point lower than that for which the bellows are adjusted.

It will be understood in using a torch of this kind for the cutting of metal that the burning of the combustible mixture is first employed for the purpose of preheating the metal along the line where it is to be severed. As soon as the metal has been preheated to the proper degree the operator throws lever 84 to its upper position to unseat the valve 81, whereupon a direct flow of high pressure oxygen passes through the torch and into the bore 100 in the nozzle, emerging therefrom in a jet which can be directed against the preheated metal to dissolve or destroy the carbon therein and effect a severing of the metal along the line desired. As soon as the metal has been severed the operator moves the lever 84 to closed position to seal the valve 81 and stop the flow of high pressure oxygen, then moves the lever 38 to pilot position, whereupon the tool is in condition to again be used in the cutting of metal by the manipulations hereinbefore referred to.

It will have been noted that during the use of the tool and particularly during the time the metal is being preheated, it is unnecessary for the operator to adjust valves in order to provide the proper combustible mixture at the nozzle. In the ordinary cutting torch or blowpipe used for this purpose there are usually a pair of valves, one controlling the oxygen and the other the gas, which the operator must constantly adjust during the use of the tool to bring about the proper combustible mixture for the flame. The result is that the operator must be highly skilled in order to use the conventional tool of this character, and must be capable from a visual inspection, of knowing when he has obtained the correct flame for the preheating operation.

In using the tool of the present invention the operator need only move the lever 38 to the indicated positions and the proper combustible mixture will automatically be provided at the nozzle, inasmuch as the bellows controlled valves have been present for predetermined pressures while the metering orifices have been preselected to permit the correct flow of oxygen and gas therethrough, which will provide the requisite and correct combustible mixture.

When the tool is used for welding metal it is only necessary for the operator to move the lever 38 to the indicated positions, since a flame only is employed in the welding operation. At this time the lever 84 will remain in closed position and there will be no flow through the bore 100 in the nozzle of high pressure oxygen.

Although preferred embodiments of the invention have been illustrated and described herein, it will be understood that the invention is susceptible of various modifications and adaptations within the scope of the appended claims.

Having thus described our invention, we claim:

1. In a cutting torch or blowpipe comprising a body having inlet connections adjacent one of its ends for a source of inflammable gas and a source of oxygen and a mixing chamber adjacent its opposite end, a nozzle connected to said body and in communication with said mixing chamber, said body being provided with separate passages interconnecting said inlet connections and said mixing chamber, valves in said passages controlling the inlet of the gas and oxygen, and separate automatic pressure control means in said body and associated with said passages intermediate said valves and said mixing chamber and functioning independently of each other to regulate the pressures of the gas and oxygen flowing therethrough.

2. A cutting torch or blowpipe comprising a body having adjacent one of its ends inlet connections with sources of supply of inflammable gas and oxygen and adjacent its other end a mixing chamber, separate passages in baid body interconnecting said inlet connections and said mixing chamber and each having portions accessible from the exterior of the body and shaped to receive a valve insides or core of the type employed in tire valve stems, a valve insides or core of said type removably mounted as a unit in each of said portions and constituting valves adjacent the inlet ends of said passages for controlling the flow of gas and oxygen therethrough, separate automatic pressure regulating means mounted in said body and associated with said passages intermediate said valve insides or cores and said mixing chamber and functioning independently of each other for controlling the pressure of the gas and oxygen flowing through the passages, and a nozzle operatively connected with said body and in communication with said mixing chamber.

3. A cutting torch or blowpipe comprising a body having adjacent one of its ends inlet connections with sources of supply of an inflammable gas and oxygen and adjacent its other end a mixing chamber, separate passages extending through said body and interconnecting said mixing chamber and said inlet connections and having portions adjacent the latter accessible from the exterior of said body and each shaped to receive a valve insides or core of the type employed in tire valve stems, a valve insides or core of said type removably mounted as a unit in each of said portions and constituting valves adjacent the ends of said passages for controlling the flow of gas and oxygen therethrough, means carried by said body for operating said valve insides or cores, a single actuating member for said means operatively associated therewith and mounted exteriorly of the body, separate automatic pressure regulating means mounted in said body and associated with said passages intermediate said valve insides or cores and said mixing chamber and functioning independently of each other for automatically controlling the pressure of the gas and oxygen flowing through said passages, and a nozzle operatively connected with said body and in communication with said mixing chamber.

4. A cutting torch or blowpipe comprising a body having passages therethrough for an inflammable gas and oxygen, a nozzle connected to said body and in communication with said passages, and separate pressure regulating valves carried by said body and associated with said passages for regulating automatically and independently of each other the pressure of the gas and oxygen flowing therethrough, said pressure regulating valves being provided with means such that when said valves are seated a seepage of gas and oxygen takes place therearound, and means for controlling the flow of gas or oxygen through said passages.

5. In a cutting torch or blowpipe comprising a body having inlet connections adjacent one of its ends for a source of inflammable gas and a source of oxygen and a mixing chamber adjacent its opposite end, a nozzle connected to said body and in communication with said mixing chamber, said body being provided with separate passages interconnecting said inlet connections and said mixing chamber, separate valves in said passages controlling the inlet of the gas and oxygen, separate automatic pressure control means in said body and associated with said passages intermediate said valves and said mixing chamber and functioning independently of each other for regulating the pressure of the gas and oxygen flowing therethrough, and metering devices in said passages intermediate said pressure control means and said mixing chamber and causing predetermined amounts of gas and oxygen to flow into said mixing chamber.

JOHN C. CROWLEY.
CHARLES F. CARROLL.